United States Patent
Pinciuc et al.

(10) Patent No.: US 10,965,162 B2
(45) Date of Patent: Mar. 30, 2021

(54) WIRELESS POWER SYSTEMS

(71) Applicant: Apple Inc., Cupertino, CA (US)

(72) Inventors: Christopher M. Pinciuc, Cupertino, CA (US); Zaki Moussaoui, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 18 days.

(21) Appl. No.: 16/357,040

(22) Filed: Mar. 18, 2019

(65) Prior Publication Data

US 2019/0348864 A1    Nov. 14, 2019

Related U.S. Application Data

(60) Provisional application No. 62/668,611, filed on May 8, 2018.

(51) Int. Cl.
*H02J 50/12* (2016.01)
*H01Q 1/36* (2006.01)
*H04B 5/00* (2006.01)

(52) U.S. Cl.
CPC ............ *H02J 50/12* (2016.02); *H01Q 1/36* (2013.01); *H04B 5/0037* (2013.01); *H04B 5/0081* (2013.01)

(58) Field of Classification Search
CPC ........ B60L 11/00; B60L 11/182; H01F 38/00; H01F 38/14; H01Q 1/00; H01Q 1/36; H02J 17/00; H02J 5/00; H02J 5/005; H02J 50/00; H02J 50/12; H02J 50/80; H02J 50/90; H02J 7/00; H02J 7/025; H04B 1/00; H04B 1/40; H04B 5/00; H04B 5/0037; H04B 5/0081
(Continued)

(56) References Cited

U.S. PATENT DOCUMENTS

| 9,260,026 | B2 | 2/2016 | Miller et al. |
| 10,027,183 | B2 | 7/2018 | Miyamoto et al. |

(Continued)

FOREIGN PATENT DOCUMENTS

| CN | 105745810 A | 7/2016 |
| CN | 106205986 A | 12/2016 |

(Continued)

*Primary Examiner* — Lincoln D Donovan
*Assistant Examiner* — Dave Mattison
(74) *Attorney, Agent, or Firm* — Treyz Law Group, P.C.; G. Victor Treyz; Jason Tsai

(57) ABSTRACT

A power system has a wireless power transmitting device and a wireless power receiving device. Coils in the power transmitting and receiving devices are used to transmit and receive wireless power signals. The coils may include pot core coils, figure eight coils, solenoids, and other coils. A solenoid array may extend under a charging surface in a wireless power transmitting device. Solenoids in the array may be separated from each other by small gaps. Solenoids may have rectangular outlines, hexagonal outlines, or other shapes. Pot core coils may have a magnetic material with a circular groove of a groove of other suitable shapes that contains wire windings. Figure eight coils may have first and second adjacent magnetic cores with respective counterclockwise and clockwise wire windings. Magnets and other alignment structures can be used to help align coils in transmitting and receiving devices.

20 Claims, 9 Drawing Sheets

(58) Field of Classification Search
USPC .......................................................... 307/104
See application file for complete search history.

(56) References Cited

U.S. PATENT DOCUMENTS

| | | | |
|---|---|---|---|
| 10,181,759 | B2 | 1/2019 | Chopra et al. |
| 10,218,221 | B2 | 2/2019 | Arnold et al. |
| 2008/0224543 | A1* | 9/2008 | Mizutani ................. H01F 38/14 |
| | | | 307/104 |
| 2014/0028109 | A1 | 1/2014 | Simon et al. |
| 2015/0279557 | A1* | 10/2015 | Chiyo ..................... H02J 50/90 |
| | | | 307/104 |
| 2018/0013310 | A1 | 1/2018 | Moussaoui et al. |
| 2018/0123392 | A1* | 5/2018 | Pinciuc ............... H01F 27/2823 |
| 2018/0198322 | A1 | 7/2018 | Mercier et al. |
| 2018/0343042 | A1* | 11/2018 | Luzinski ................. H01Q 7/04 |
| 2019/0076033 | A1 | 3/2019 | Sweeney et al. |
| 2019/0081516 | A1* | 3/2019 | Shahsavari ........ G01R 27/2611 |

FOREIGN PATENT DOCUMENTS

| | | |
|---|---|---|
| CN | 107534320 A | 1/2018 |
| CN | 107872098 A | 4/2018 |
| EP | 3444924 A1 | 2/2019 |

\* cited by examiner ations in system 8 are sometimes

WIRELESS POWER SYSTEMS

This application claims the benefit of U.S. provisional patent application No. 62/668,611, filed on May 8, 2018 which is hereby incorporated by reference herein in its entirety.

FIELD

This relates generally to power systems, and, more particularly, to wireless power systems.

BACKGROUND

Portable electronic devices such as cellular telephones, wristwatch devices, tablet computers, wireless earbuds, and other portable devices use batteries. The batteries in these devices can be charged using a battery charging system. To enhance convenience for users, wireless power systems have been provided that allow batteries in portable electronic devices to be charged wirelessly.

SUMMARY

A power system has a wireless power transmitting device and a wireless power receiving device. Coils in the power transmitting and receiving devices are used to transmit and receive wireless power signals. Good coupling between transmitting and receiving coils promotes wireless power transfer efficiency.

Embodiments of power transmission coils in the transmitting and receiving devices may include pot core coils, multi-core coils such as figure eight coils having clockwise and counterclockwise windings around respective magnetic cores, solenoids, and other coils.

In some embodiments, a solenoid array may extend under a charging surface in a wireless power transmitting device such as a charging mat. Solenoids in the array may be separated from each other by small gaps. Solenoids may have rectangular outlines, hexagonal outlines, or other shapes. Clusters of solenoids that are overlapped by wireless power receiving coils may be driven together to produce wireless power signals. Adjacent solenoids can be driven in-phase or, in some configurations, can be drive out-of-phase with each other.

In some embodiments, pot core coils have a core of magnetic material with a groove. Wire windings are formed in the groove. The groove may have a rotationally symmetric shape such as a circular shape or may have other suitable shapes.

In some embodiments, magnets and other alignment structures in the transmitting and receiving devices help align coils in the transmitting and receiving devices.

In some embodiments, a receiving device may have a figure eight coil for receiving power from a corresponding figure eight coil in a wireless power transmitting device and a non-figure-eight coil formed from a single loop of wire turns that is used in receiving power from non-figure-eight coil(s) in a wireless power transmitting device.

DETAILED DESCRIPTION

Portable electronic devices have batteries. Wired and wireless charging systems may be used in charging the batteries. For example, a user may place devices such as wristwatch devices and cellular telephones on a wireless charging mat to wirelessly charge these devices.

Figure 1:
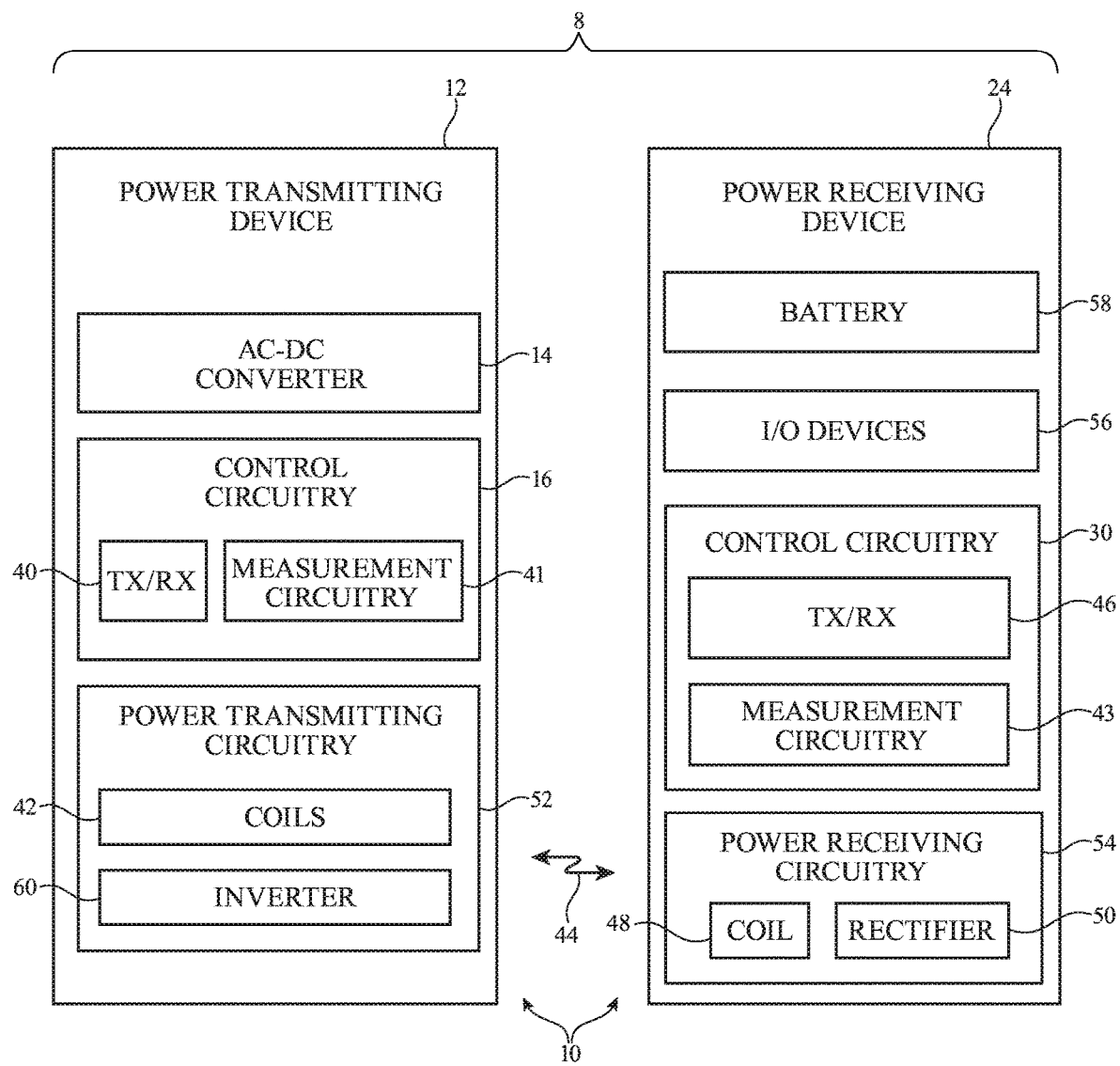
FIG. 1 is a schematic diagram of an illustrative wireless power system in accordance with an embodiment.

An illustrative wireless power system is shown in FIG. 1. Wireless power system 8 (sometimes referred to as a wireless charging system) has wireless power transmitting equipment that is used for supplying wireless power. The wireless power is used for charging batteries in electronic devices and in supplying power to other device components.

Figure 8:
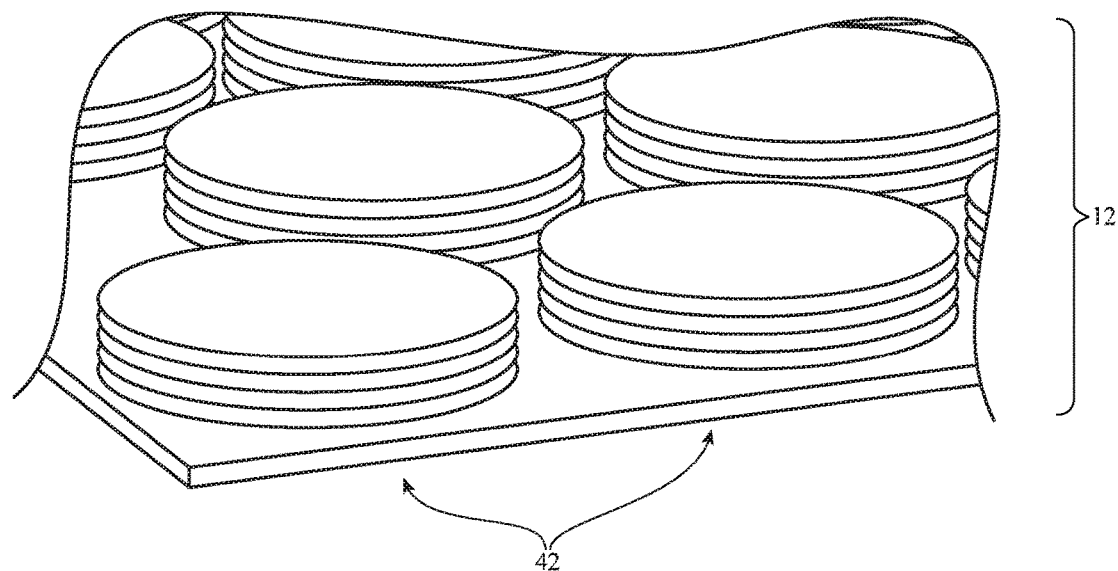

As shown in FIG. 8, wireless power system 8 includes electronic devices 10. Electronic devices 10 include electronic devices that provide power (e.g., charging mats, charging pucks, charging stands, tablet computers and other portable electronic devices with wireless power transmitting capabilities, etc.). Electronic devices 10 also include electronic devices that receive power. These power receiving devices may include, for example, portable electronic devices such as cellular telephones, wireless earbuds, and wristwatch devices (as examples).

Power can be used for powering circuitry in a power receiving device other than a battery and can be used for charging a battery in a power receiving device. Because battery charging is a common use of received power, wireless power transfer operations in system 8 are sometimes referred to as battery charging operations. Power can also be provided to a receiving device to operate a display or other circuitry in the receiving device without battery charging, if desired.

Charging can be performed by transferring power from a power transmitting device such as device 12 to a power receiving device such as device 24. Power may be transferred between device 12 and device 24 wirelessly (e.g., using inductive charging). In the example of FIG. 1, power is being transferred wirelessly using wireless power signals 44.

During operation of system 8, wireless power transmitting device 12 wirelessly transmits power to one or more wireless power receiving devices such as device 24. The wireless power receiving devices may include electronic devices such as wristwatches, cellular telephones, tablet computers, laptop computers, ear buds, battery cases for ear buds and other devices, tablet computer pencils and other input-output devices (e.g., accessory devices), wearable devices, or other electronic equipment. The wireless power transmitting device may be an electronic device such as a wireless charging mat that has a charging surface (e.g., a planar charging surface) that receives portable devices to be charged, a tablet computer or other portable electronic device with wireless power transmitting circuitry (e.g., one of devices 24 that has wireless power transmitting circuitry), or other wireless power transmitting device. The wireless power receiving devices use power from the wireless power transmitting device for powering internal components and for charging internal batteries.

As shown in FIG. 1, wireless power transmitting device 12 includes control circuitry 16. Wireless power receiving device 24 includes control circuitry 30. Control circuitry in system 8 such as control circuitry 16 and control circuitry 30 (and/or control circuitry in other devices 10) is used in controlling the operation of system 8. This control circuitry may include processing circuitry associated with microprocessors, power management units, baseband processors, digital signal processors, microcontrollers, and/or application-specific integrated circuits with processing circuits. The processing circuitry implements desired control and communications features in devices 12 and 24. For example, the processing circuitry may be used in selecting coils, adjusting the phases and magnitudes of coil drive signals, determining power transmission levels, processing sensor data and other data, processing user input, handling negotiations between devices 12 and 24, sending and receiving in-band and out-of-band data, making measurements, starting and stopping charging operations, turning devices 10 on and off, placing devices 10 in low-power sleep modes, and otherwise controlling the operation of system 8.

Control circuitry in system 8 may be configured to perform operations in system 8 using hardware (e.g., dedicated hardware or circuitry), firmware and/or software. Software code for performing operations in system 8 is stored on non-transitory computer readable storage media (e.g., tangible computer readable storage media) in control circuitry 8. The software code may sometimes be referred to as software, data, program instructions, instructions, or code. The non-transitory computer readable storage media may include non-volatile memory such as non-volatile random-access memory (NVRAM), one or more hard drives (e.g., magnetic drives or solid state drives), one or more removable flash drives or other removable media, or the like. Software stored on the non-transitory computer readable storage media may be executed on the processing circuitry of devices 10 (e.g., control circuitry 16 and/or 30). The processing circuitry may include application-specific integrated circuits with processing circuitry, one or more microprocessors, a central processing unit (CPU) or other processing circuitry.

Power transmitting device 12 may be a stand-alone power adapter (e.g., a wireless charging mat that includes power adapter circuitry), may be a wireless charging mat that is coupled to a power adapter or other equipment by a cable, may be a portable electronic device (cellular telephone, tablet computer, laptop computer, etc.), may be equipment that has been incorporated into furniture, a vehicle, or other system, or may be other wireless power transfer equipment. Illustrative configurations in which wireless power transmitting device 12 is a wireless charging mat or portable electronic device are sometimes described herein as an example.

Power receiving device 24 may be a portable electronic device such as a wristwatch, a cellular telephone, a laptop computer, a tablet computer, an accessory such as an earbud, a tablet computer input device such as a wireless tablet computer pencil, a battery case, or other electronic equipment. Power transmitting device 12 may be coupled to a wall outlet (e.g., an alternating current power source), may have a battery for supplying power, and/or may have another source of power. Power transmitting device 12 may have an alternating-current (AC) to direct-current (DC) power converter such as AC-DC power converter 14 for converting AC power from a wall outlet or other power source into DC power. In some configurations, AC-DC power converter 14 may be provided in an enclosure (e.g., a power brick enclosure) that is separate from the enclosure of device 12 (e.g., a wireless charging mat enclosure or portable electronic device enclosure) and a cable may be used to couple DC power from the power converter to device 12. DC power may be used to power control circuitry 16.

During operation, a controller in control circuitry 16 may use power transmitting circuitry 52 to transmit wireless power to power receiving circuitry 54 of device 24. Power transmitting circuitry 52 may have switching circuitry (e.g., inverter circuitry 60 formed from transistors) that is turned on and off based on control signals provided by control circuitry 16 to create AC current signals through one or more transmit coils 42. Coils 42 may be arranged in a planar coil array (e.g., in configurations in which device 12 is a wireless charging mat) or may be arranged in other configurations. In some arrangements, device 12 may have only a single coil. In arrangements in which device 12 has multiple coils, the coils may be arranged in one or more layers. Coils in different layers may or may not overlap with each other.

In some configurations, coils 42 are formed from solenoids that help direct magnetic fields vertically (e.g., parallel to the surface normal of a charging mat). Coils 48 can also be formed from solenoids. The solenoids in a charging mat may be formed in an array that lies under the charging surface of the charging mat and that extends across the charging surface of the charging mat.

Coils 42 and/or 48 can also be formed using figure eight winding patterns (e.g., wires wrapped around a pair of adjacent cores so that a first of the cores produces upwardly directed magnetic fields and a second of the cores produces downwardly directed magnetic fields.

In some configurations, coils 48 may be implemented using pot cores formed of magnetic material with circular grooves or grooves of other shapes.

As the AC currents pass through one or more coils 42, a time varying electromagnetic (e.g., magnetic) field (signals 44) is produced that is received by one or more corresponding receiver coils such as coil 48 in power receiving device 24. When the time varying electromagnetic field is received by coil 48, corresponding alternating-current currents are induced in coil 48. Rectifier circuitry such as rectifier 50, which contains rectifying components such as synchronous rectification metal-oxide-semiconductor transistors arranged in a bridge network, converts received AC signals (received alternating-current signals associated with electromagnetic signals 44) from coil 48 into DC voltage signals for powering device 24.

The DC voltages produced by rectifier 50 can be used in powering (charging) an energy storage device such as battery 58 and can be used in powering other components in device 24. For example, device 24 may include input-output devices 56 such as a display, touch sensor, communications circuits, audio components, sensors, components that produce electromagnetic signals that are sensed by a touch sensor in tablet computer or other device with a touch sensor (e.g., to provide pencil input, etc.), and other components and these components may be powered by the DC voltages produced by rectifier 50 (and/or DC voltages produced by battery 58 or other energy storage device in device 24).

Device 12 and/or device 24 may communicate wirelessly (e.g., using in-band and out-of-band communications). Device 12 may, for example, have wireless transceiver circuitry 40 that wirelessly transmits out-of-band signals to device 24 using an antenna. Wireless transceiver circuitry 40 may be used to wirelessly receive out-of-band signals from device 24 using the antenna. Device 24 may have wireless transceiver circuitry 46 that transmits out-of-band signals to device 12. Receiver circuitry in wireless transceiver 46 may use an antenna to receive out-of-band signals from device 12. In some configurations, devices 10 can communicate through local area networks and/or wide area networks (e.g., the internet).

Wireless transceiver circuitry 40 can use one or more coils 42 to transmit in-band signals to wireless transceiver circuitry 46 that are received by wireless transceiver circuitry 46 using coil 48. Any suitable modulation scheme may be used to support in-band communications between device 12 and device 24. With one illustrative configuration, frequency-shift keying (FSK) is used to convey in-band data from device 12 to device 24 and amplitude-shift keying (ASK) is used to convey in-band data from device 24 to device 12. Power may be conveyed wirelessly from device 12 to device 24 during these FSK and ASK transmissions. Other types of communications (e.g., other types of in-band communications) may be used, if desired.

During wireless power transmission operations, circuitry 52 supplies AC drive signals to one or more coils 42 at a given power transmission frequency. The power transmission frequency may be, for example, a predetermined frequency of about 125 kHz, at least 80 kHz, at least 100 kHz, less than 500 kHz, less than 300 kHz, or other suitable wireless power frequency. In some configurations, the power transmission frequency may be negotiated in communications between devices 12 and 24. In other configurations, the power transmission frequency may be fixed.

During wireless power transfer operations, while power transmitting circuitry 52 is driving AC signals into one or more of coils 42 to produce signals 44 at the power transmission frequency, wireless transceiver circuitry 40 uses FSK modulation to modulate the power transmission frequency of the driving AC signals and thereby modulate the frequency of signals 44. In device 24, coil 48 is used to receive signals 44. Power receiving circuitry 54 uses the received signals on coil 48 and rectifier 50 to produce DC power. At the same time, wireless transceiver circuitry 46 uses FSK demodulation to extract the transmitted in-band data from signals 44. This approach allows FSK data (e.g., FSK data packets) to be transmitted in-band from device 12 to device 24 with coils 42 and 48 while power is simultaneously being wirelessly conveyed from device 12 to device 24 using coils 42 and 48. Other types of in-band communications between device 12 and device 24 may be used, if desired.

In-band communications between device 24 and device 12 uses ASK modulation and demodulation techniques or other suitable in-band communications techniques. Wireless transceiver circuitry 46 transmits in-band data to device 12 by using a switch (e.g., one or more transistors in transceiver 46 that are coupled coil 48) to modulate the impedance of power receiving circuitry 54 (e.g., coil 48). This, in turn, modulates the amplitude of signal 44 and the amplitude of the AC signal passing through coil(s) 42. Wireless transceiver circuitry 40 monitors the amplitude of the AC signal passing through coil(s) 42 and, using ASK demodulation, extracts the transmitted in-band data from these signals that was transmitted by wireless transceiver circuitry 46. The use of ASK communications allows a stream of ASK data bits (e.g., a series of ASK data packets) to be transmitted in-band from device 24 to device 12 with coils 48 and 42 while power is simultaneously being wirelessly conveyed from device 12 to device 24 using coils 42 and 48.

Control circuitry 16 has external object measurement circuitry 41 (sometimes referred to as foreign object detection circuitry or external object detection circuitry) that detects external objects on a charging surface associated with device 12. Circuitry 41 can detect foreign objects such as coils, paper clips, and other metallic objects and can detect the presence of wireless power receiving devices 24. During object detection and characterization operations, external object measurement circuitry 41 can be used to make measurements on coils 42 to determine whether any devices 24 are present on device 12 (e.g., whether devices 24 are suspected to be present on device 12). Measurement circuitry 43 in control circuitry 30 and/or in control circuitry 16 may also be used in making current and voltage measurements, and/or may be used in making other measurements on wireless power receiving circuitry 54.

Figure 2:
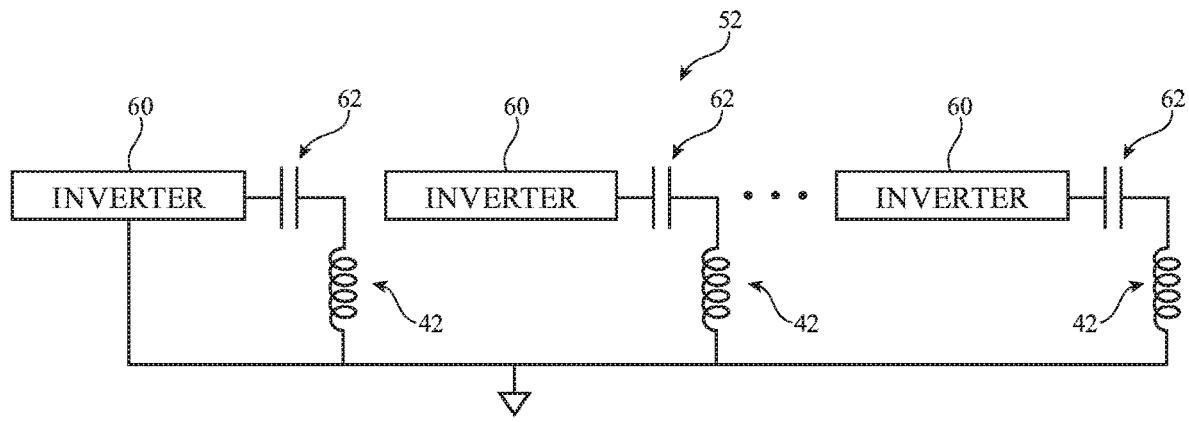
FIG. 2 is a schematic diagram of illustrative wireless power transmitting circuitry in accordance with an embodiment.

Illustrative wireless power transmitting circuitry 52 in a configuration in which wireless power transmitting device 12 has multiple coils 42 is shown in FIG. 2. With the illustrative arrangement of FIG. 2, circuitry 52 has inverter circuitry formed from multiple inverters 60, each controlled by control circuitry 16 and each supplying drive signals to a corresponding wireless power transmitter circuit having a respective coil 42 and capacitance (e.g., capacitor 62). The phase and magnitude of the alternating-current drive signal supplied by each inverter 60 to its associated coil 42 can be adjusted independently by control circuitry 16. As a result, one or more of coils 42 (e.g., coils in a cluster overlapped by coil 48 in device 24) can be activated while remaining coils are not driven and remain inactive. The phase of each active coil 42 can also be varied. For example, one coil may have a first phase and a second coil (e.g., an adjacent coil) may be driven with opposite phase (e.g., the second coil may have a second phase that is 180° out of phase with the first phase). Using arrangements such as these, control circuitry 16 can control the strength and orientation of the magnetic fields produced by coils 42.

Figure 3:
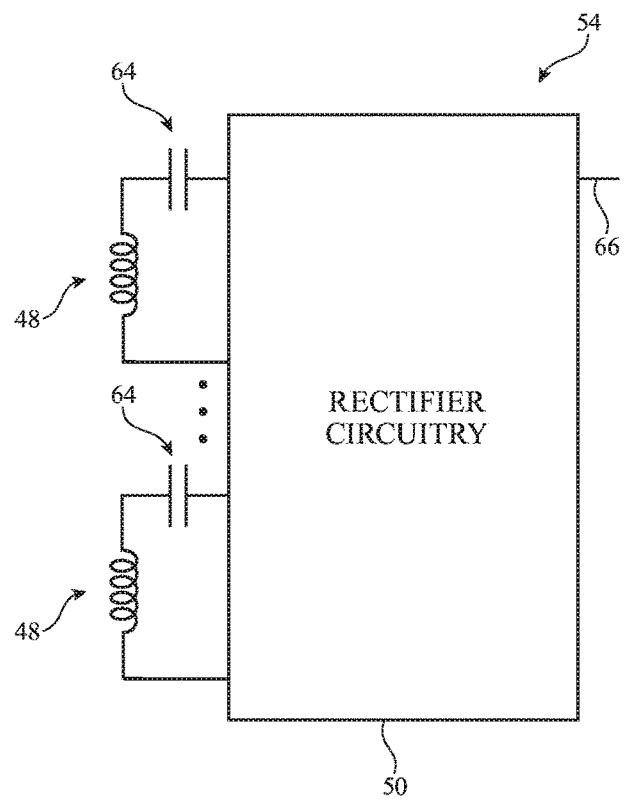
FIG. 3 is a diagram of illustrative wireless power receiving circuitry in accordance with an embodiment.

In device 24, wireless power receiver circuitry 54 may have one or more coils 48. As shown in FIG. 3, for example, rectifier circuitry 50 can be used to receive wireless power from one or more, two or more, or three or more respective power receiving circuits, each of which includes a respective coil 48 and associated capacitance (see, e.g., each capacitor 64). Rectifier circuitry 50 may contain a single rectifier shared between each power receiving circuit using switches and/or may contain multiple rectifiers, each of which is coupled to a respective power receiving circuit. During operation, rectifier circuitry 50 receives wireless power signals 44 from device 12 using coil(s) 48 and supplies corresponding output power (e.g., DC power) at output 66 for powering the circuitry of device 24. Coils 48 in circuitry 54 may be of the same type and/or may include coils 48 of different types. For example, one of coils 48 may be a single circular or rectangular loop with multiple turns and another of coils 48 may have a pair of cores and associated windings with a figure eight pattern that form a figure eight coil (as examples). Control circuitry 30 can use rectifier circuitry 50 to switch desired coil(s) 48 into use dynamically (e.g., upon detecting the type of wireless power signals 44 and/or wireless power protocols being used by device 12, etc.). In some configurations, the power handling capability of the different coils 48 and the associated rectifier circuitry of device 24 may differ. For example, a first coil 48 may be formed from a single loop of one or more turns and may have a maximum power transfer capability of 7.5 W, whereas a second coil 48 may be formed from figure eight windings of one or more turns and may have a maximum power transfer capability of more than 7.5 W (e.g., 15 W).

Figure 4A:
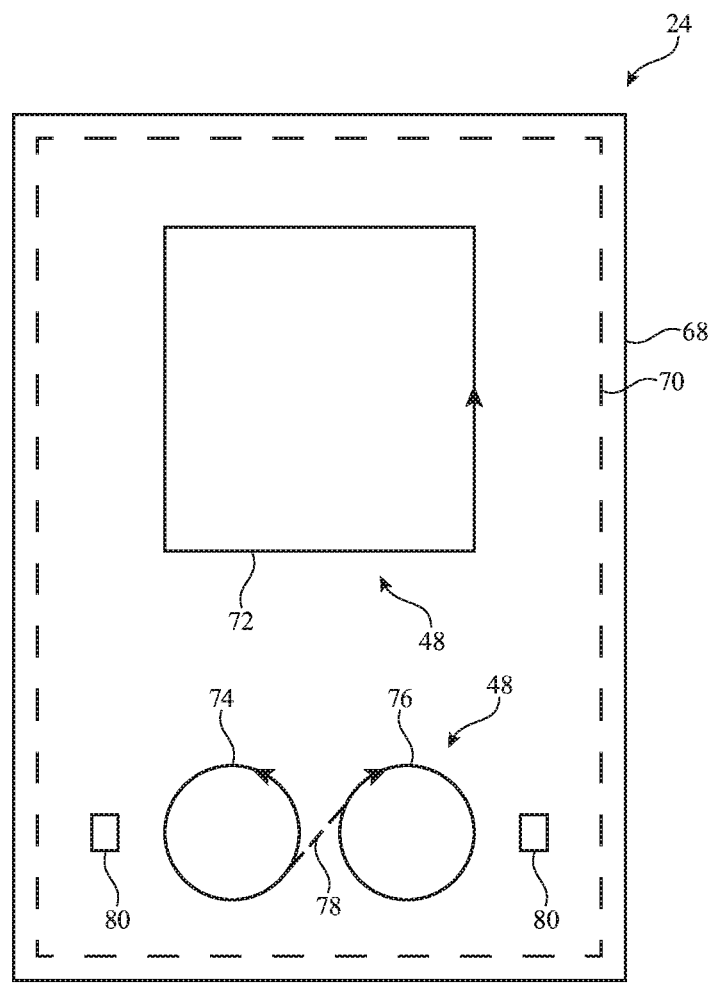
FIG. 4A is a rear view of an illustrative wireless power receiving device with coils for receiving wireless power in accordance with an embodiment.

FIG. 4A is a rear view of an illustrative wireless power receiving device (e.g., a cellular telephone, tablet computer, wristwatch, etc.). Housing 68 of device 24, which may sometimes be referred to as an enclosure or case, may be formed of plastic, glass, ceramics, fiber composites, metal (e.g., stainless steel, aluminum, etc.), other suitable materials, or a combination of any two or more of these materials. In the example of FIG. 4A, device 24 has a rectangular housing 68 with a rear wall facing outwardly from the page. Housing 68 may have other shapes, if desired. For example, housing 68 may have a circular outline, may have a shape with one or more curved edges and/or one or more straight edges, and/or may have other suitable shapes. Housing 68 may be formed using a unibody configuration in which some or all of housing 68 is machined or molded as a single structure or may be formed using multiple structures (e.g., an internal frame structure, one or more structures that form exterior housing surfaces, etc.).

Device 24 may have coils 48 for receiving wireless power. In the example of FIG. 4A, one of coils 48 is formed from a single isolated loop of one or more turns of wire 72 and another of coils 48 has a figure eight pattern of wire windings with one or more turns (sometimes referred to as a figure-eight coil). During operation in system 8, an appropriate coil is switched into use by control circuitry 30. For example, if device 24 is located on a charging mat that has wireless power transmitting circuitry matched to a figure eight coil, the figure eight coil can be switched into use. In response to detecting that device 24 is located on a charging mat that is transmitting wireless power signals suitable for reception with the single isolated loop, the single loop coil can be switched into use. Configurations in which both coils are simultaneously used in receiving power can also be used.

Figure 4B:
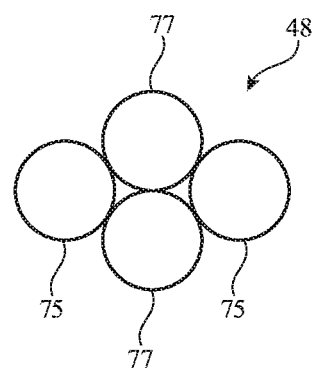
FIG. 4B is a top view of an illustrative coil formed from a cluster of four cores in accordance with an embodiment.

A coil with figure eight windings (e.g., the lower of coils 48 in FIG. 4A) has a first core of magnetic material (e.g., iron, ferrite, etc.) with one or more turns of counterclockwise windings 74 and has a second core of magnetic material with one or more turns of clockwise windings 76. Wire segment 78 is used to join the windings around the first core with the windings around the second core (e.g., a single continuous wire can be used in forming the windings on both cores). During operation, the core of coil 48 that is associated with windings 74 receives a magnetic field that is opposite in phase to the core of coil 48 that is associated with windings 76. By aligning the figure eight coil of device 24 to a corresponding figure eight coil of device 12, wireless power can be transferred efficiently. For example, a high coupling efficiency can be obtained (e.g., coupling coefficient k may be at least 0.8 or at least 0.9). If desired, the windings around the first and second cores can be used independently (e.g., first and second windings on first and second respective cores for coils 42 can be driven out of phase in device 12 or first and second windings on first and second respective cores for coils 48 can be used to rectify out of phase signals in device 24 without physically joining the first and second windings with a joining wire segment). Another possible arrangement for coils 42 and 48 involves creating a winding pattern for each coil that includes a pair of cores with counterclockwise windings and a pair of cores with clockwise windings. As shown in FIG. 4B, for example, coil 48 (and coil 42) may be formed from a cluster of four cores in which two cores 77 at the 12:00 and 6:00 positions have clockwise windings and two cores 75 at the 3:00 and 9:00 positions have counterclockwise windings. A single continuous wire may be wrapped around all four cores in the coil. Illustrative configurations in which device 12 and/or device 24 has figure eight coils are sometimes described herein as an example.

To help align figure eight coils in system 8, magnets 80 (and/or alignment components formed from corresponding magnetic materials such as iron bars), or other alignment mechanisms (e.g., physical alignment structures having mating protrusions and recesses, etc.) can be included in device 12 and device 24. Magnets 80 help a user align device 24 and its figure eight coil to a corresponding power transmitting figure eight coil in device 12, thereby enhancing coupling efficiency.

In some configurations for device 24, a display is formed on the front face of device 24 (e.g., on an opposing face of device 24 from the rear face of device 24 that is formed by the rear housing wall in housing 68). In the example of FIG. 4A, display 70 has been formed on the front face of device 24 and overlaps coils 48. Display 70 may be a touch screen display that incorporates a layer of conductive capacitive touch sensor electrodes or other touch sensor components (e.g., resistive touch sensor components, acoustic touch sensor components, force-based touch sensor components, light-based touch sensor components, etc.) or may be a display that is not touch-sensitive. Capacitive touch screen electrodes may be formed from an array of indium tin oxide pads or other transparent conductive structures.

Display 70 may have an active area that includes an array of pixels. Display 70 may be a liquid crystal display, a light-emitting diode display (e.g., an organic light-emitting diode display), an electrophoretic display, or a display formed using other display technologies. Display 70 may be protected using a display cover layer such as a layer of transparent glass, clear plastic, transparent ceramic, sapphire, or other transparent crystalline material, or other optically transparent layer(s). The display cover layer may have a planar shape, a convex curved profile, a shape with planar and curved portions, a layout that includes a planar main area surrounded on one or more edges with a portion that is bent out of the plane of the planar main area, or other suitable shapes. In some configurations, the display cover layer covers the entire front face of device 24.

Figure 5:
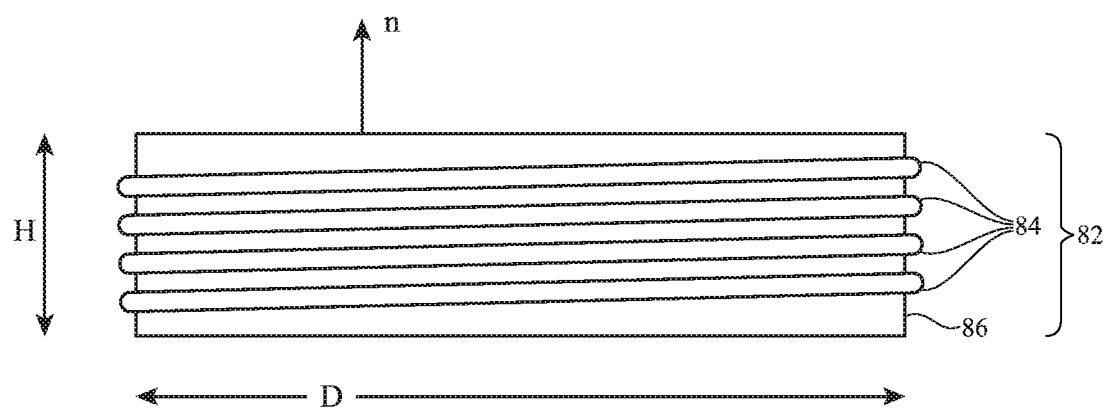
FIG. 5 is a side view of an illustrative coil for a wireless power system in accordance with an embodiment.

In some embodiments, coils 42 and/or 48 are formed from cores of magnetic material wound with helical wire windings to form solenoids. An illustrative solenoid coil is shown in FIG. 5. Coil 82, which may sometimes be referred to as a solenoid, has magnetic core 86 and wire windings 84.

Coils 42 and/or coils 48 of FIG. 1 may be formed using coils such as illustrative coil 82 of FIG. 5.

Core 86 of coil 82 is formed from a magnetic material (e.g., ferrite or other material with a high permeability). Core 86 may have any suitable footprint (outline when viewed from above). The magnetic cores of the solenoids that are used for forming coils 48 and/or 42 may sometimes be referred to as posts. The height H and diameter D of each solenoid (e.g., the post of magnetic material forming the solenoid core) may have any suitable ratio R=H/D. For example, the value of R may be at least 0.1, at least 0.2, at least 0.5, at least 1, at least 3, less than 2, less than 1, less than 0.5, less than 0.3, less than 0.2, or other suitable value. The value of height H in a post may be, for example, at least 0.5 mm, at least 1 mm, at least 2 mm, at least 3 mm, at least 4 mm, at least 5 mm, less than 10 mm, less than 6 mm, less than 4 mm, or other suitable value. The maximum lateral dimension (e.g., the diameter of a circular post) of each post may be less than 5 cm, less than 3 cm, less than 2 cm, at least 1 cm, or other suitable size.

Conductive lines such as wires 84 (e.g., wires formed from insulated copper or other wire structures) are wound helically around core 86 for a number of turns N. The value of N may be at least 3, at least 7, at least 10, at least 20, less than 50, less than 15, less than 6, less than 4, or other suitable number. The number of turns in coil 42 and the number of turns in coil 48 may be the same or may differ. For example, coil 48 may have more turns than coil 42 to help raise the voltage of the DC power signals in device 24 and thereby lower $I^2R$ losses in device 24. As an example, if coil 42 has NT turns, coil 48 may have at least 1.2 NT turns, at least 1.5 NT turns, at least 2 NT turns, at least 3 NT turns, fewer than 5 NT turns, etc. The wire used in forming coils 42 and 44 may be copper wire or other suitable wire (e.g., iron, iron-nickel, wire of other materials, multi-strand wire, etc.). The configuration of FIG. 5 may be used to help produce magnetic fields B that are parallel to surface normal n of core 86. In some arrangements, the use of vertically oriented magnetic fields and/or small maximum lateral coil dimensions may help enhance coupling efficiency and avoid situations in which eddy currents are induced in metal housing structures and other conductive structures in device 24.

Figure 6:
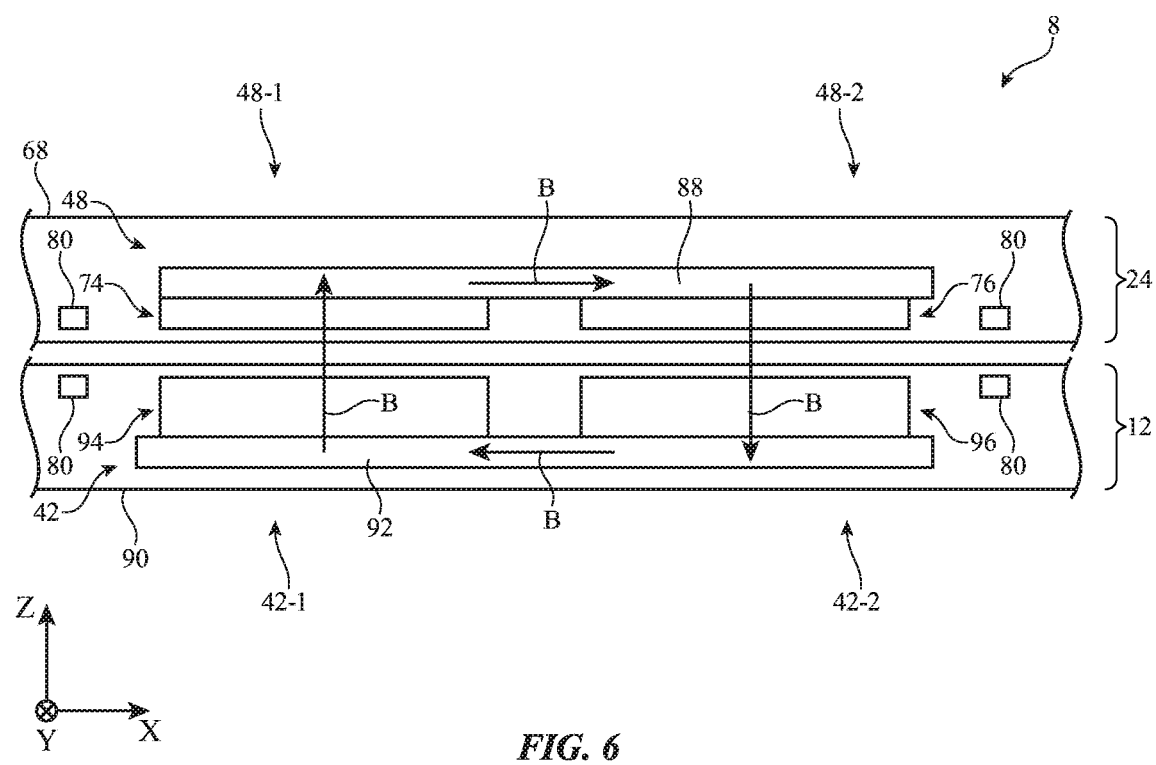
FIG. 6 is a diagram of an illustrative wireless power system in which a wireless power transmitting device is electromagnetically coupled to a wireless power receiving device and in which the transmitting and receiving devices have respective coils with figure eight wire patterns in accordance with an embodiment.

FIG. 6 is a cross-sectional side view of portions of devices 12 and 24 in system 8 showing how figure eight coils can be used in conveying wireless power signals 44 between devices 12 and 24. In the example of FIG. 6, device 12 is a wireless charging mat having a planar housing that lies in the X-Y plane of FIG. 6 (e.g., a housing 90 with planar opposing upper and lower surfaces). Housing 90 and housing 68 of device 24 has portions formed from dielectric, metal, or other materials. For example, housing 90 of device 12 may have a polymer upper wall covering magnets 80 and each coil 42 in an array of coils 42 extending laterally across the charging surface. The outer (upwardly facing) surface of the polymer (or other dielectric) that forms the upper wall defines a charging surface for device 12.

During operation, alignment magnets 80 (e.g., permanent magnets configured to mate with opposing permanent magnets or with opposing magnetic material such as bars of magnetic material) are used to ensure that a first figure eight coil in device 12 (e.g., coil 42) is aligned with a second figure eight coil in device 24 (e.g., coil 48). Each figure eight coil has a pair of cores that are wound with wires in a figure eight pattern, as described in connection with the figure eight coil of FIG. 4A. The cores and windings may have any suitable shapes (e.g., a solenoid configuration of the type described in connection with FIG. 3 or other suitable shape).

Coil 42 includes first portion 42-1 with a first core and first wire windings 94 and a second portion 42-1 with a second core and second wire windings 96. A layer of magnetic material 92 magnetically joins the respective cores in portions 42-1 and 42-2 to form a U-shaped magnetic core structure for figure eight coil 42. Coil 48 includes first portion 48-1 with a first core and first wire windings 74 and a second core with second wire windings 76. A layer of magnetic material 88 magnetically joins the respective cores in portions 48-1 and 48-2 to form a U-shaped magnetic core structure for figure eight coil 48. During operation, coil 42 is driven with a current that produces magnetic field B. Due to the figure eight arrangement of the windings in coil 42, magnetic field B is driven upwardly (in the positive Z direction of FIG. 6) in coil portion 42-1 and is driven downwardly (in the negative Z direction of FIG. 6) in coil portion 42-2. Because coil 48 is aligned with coil 42, magnetic field B flows in a loop through coils 48 and 42, as shown in FIG. 6. In particular, magnetic field B flows upwardly in portion 42-1 and portion 48-1, is conveyed horizontally through layer 88 to portion 48-2, passes downwardly through portions 48-2 and 42-2, and is conveyed horizontally back to portion 42-1 through layer 92.

Layers 88 and 92 may be formed from ferrite or other magnetic material. With one illustrative configuration, layers 88 and/or 92 are formed from a crystalline foil of magnetic material having a thickness of 50-200 microns, at least 40 microns, at least 75 microns, less than 500 microns, less than 400 microns, less than 300 microns, or other suitable thickness. Layers 88 and/or 92 and/or the magnetic material forming the cores of coils 42 and 48 may have a relatively high permeability (e.g., at least 500, at least 600, at least 800, at least 1000, at least 1400, less than 2000, or other suitable value) and a high magnetic saturation value (e.g., a saturation flux density $B_{sat}$ of 1.0 to 1.2 T, at least 0.5 T, at least 0.8 T, etc.). In some arrangements, layers 88 and/or 92 may be formed from M sublayers (where M is at least 2, at least 4, 5, less than 8, etc.). Magnetic material layers with a cracked structure may be used to help break up eddy currents. During operation, magnetic field B oscillates (because signals 44 are alternating current signals) and conveys power wirelessly from device 12 to device 24. There is a high magnetic coupling with the configuration of FIG. 6, so wireless power transfer operations are efficient.

Figure 7:
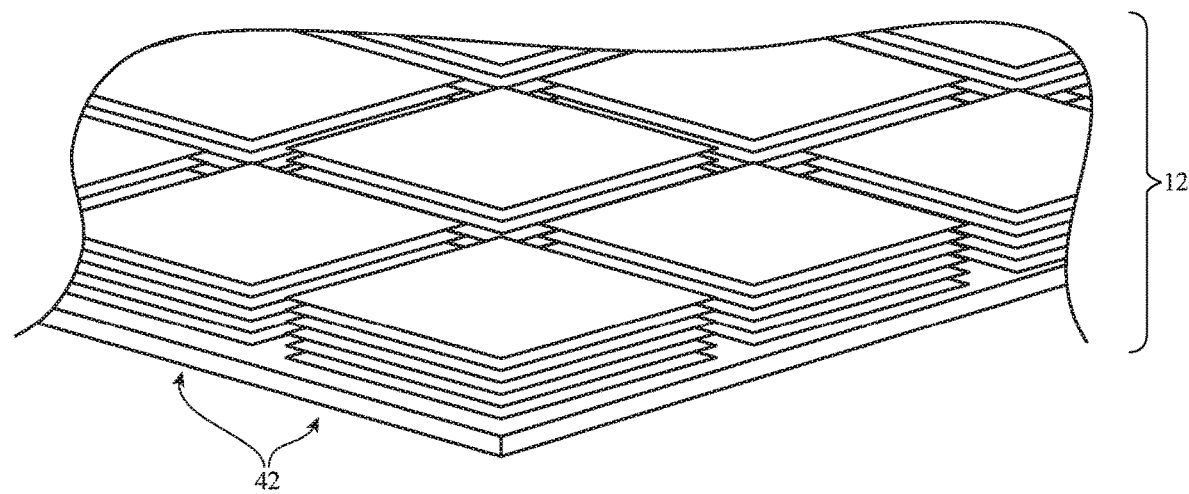
FIGS. 7 and 8 are perspective views of portions of illustrative coil arrays that extend across planar charging surfaces in wireless power transmitting devices in accordance with embodiments.
Figure 9:
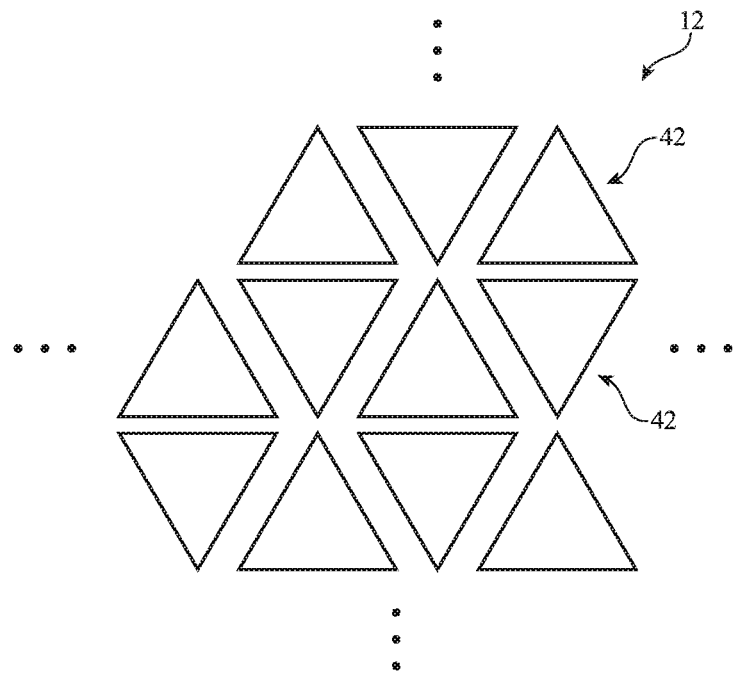
FIGS. 9 and 10 are top views of portions of illustrative coil arrays in wireless power transmitting devices in accordance with embodiments.
Figure 10:
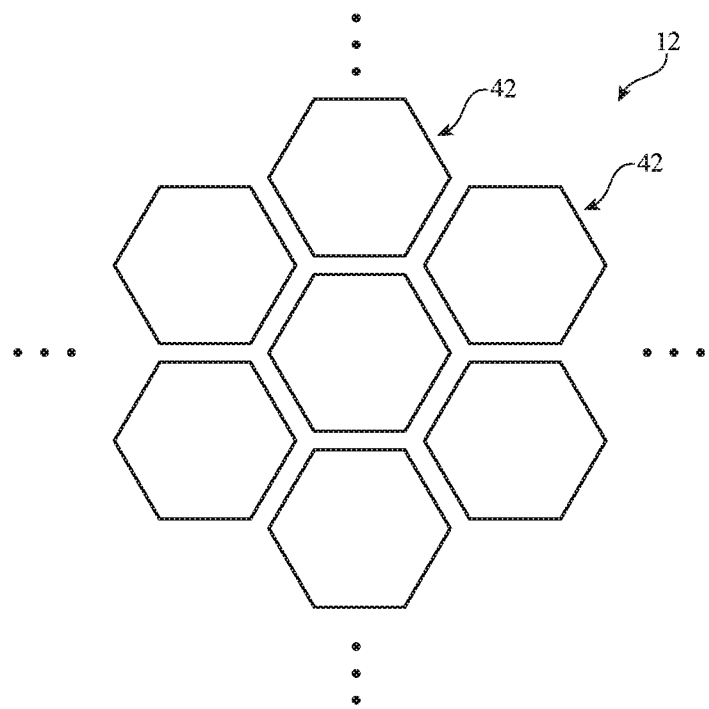

In some configurations for system 8, device 12 has an array of coils 42. Coils 42 may be solenoids (see, e.g., FIG. 5) or other suitable coils. In the arrangements of FIG. 7, coils 42 have rectangular outlines (e.g., the footprint of coils 42 is square when viewed from above). In the arrangement of FIG. 8, coils 42 have circular shapes. Other coil shapes may be used, if desired (e.g., triangular coils as shown in FIG. 9, hexagonal coils as shown in FIG. 10, etc.). These coils may be solenoids or other coils. The lateral dimensions (e.g., maximum width D of FIG. 8) of the coils 42 in device 10 may have any suitable value (e.g., at least 0.5 cm, at least 1 cm, at least 2 cm, at least 4 cm, at least 8 cm, less than 20 cm, less than 10 cm, less than 5 cm, less than 3 cm, less than 2.5 cm, less than 1.5 cm, less than 2 cm, less than 0.8 cm, less than 0.4 cm, or other suitable value).

With one illustrative configuration, the core of coil 42 may have a maximum lateral dimension of 0.5-2 cm. The use of coils with relatively small lateral dimensions may help concentrate magnetic fields and enhance wireless charging efficiency (e.g., by avoiding scenarios in which magnetic fields induce unwanted eddy currents in conductive housing structures, etc.). If desired, multiple coils 42 may be driven in phase (in effect producing a larger single coil) when such coils are overlapped by a single larger coil 48 or are otherwise in a configuration in which each of the multiple coils 42 is well coupled to the wireless power receiving circuitry of device 24. In general, any suitable pattern of coils 42 may be actively driven to produce signals 44 and these coils may be driven in phase or with any suitable set of out-of-phase drive signals. As an example, a cluster of at least 2, at least 3 at least 4, or other suitable number of coils 42 (e.g., a cluster that fits within a relatively small area such as a circle with a diameter of about 2-3 cm, etc.) may be driven in phase to provide magnetic field to a coil 48 that overlaps each of the coils 42 in the cluster. In another illustrative configuration, one or more adjacent coils may be driven 180° out of phase or with other suitable phase relative to one or more other adjacent coils.

Figure 11:
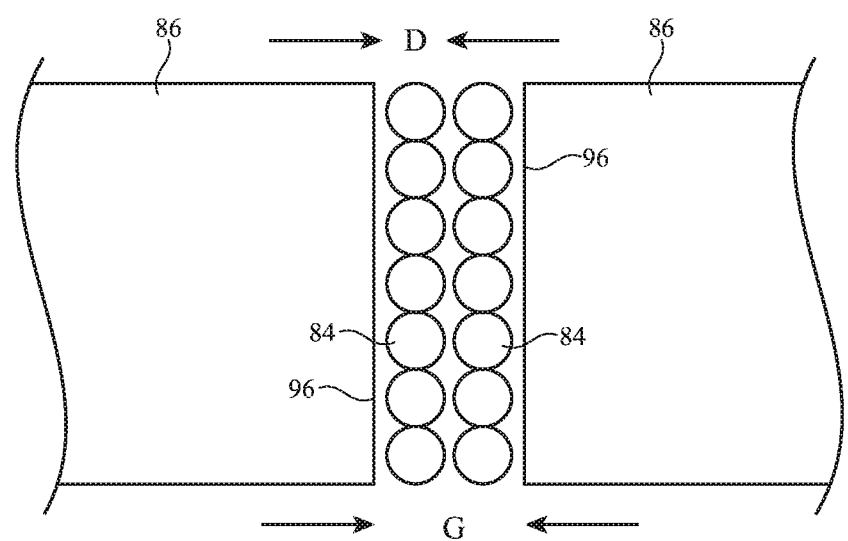
FIG. 11 is a cross-sectional side view of portions of two adjacent coils in accordance with an embodiment.

To help reduce coupling inefficiency, coils in device 12 and/or device 24 can be packed tightly. As shown in FIG. 11, for example, the gap G between adjacent coils may be close to twice the diameter D of the wire used in forming coil windings (e.g., G may be at least 2 D, at least 2.1 D, at least 2.2 D, at least 2.5 D, less than 5 D, less than 4 D, less than 3 D, less than 2.5 D, less than 2.2 D, etc.). In the example of FIG. 11, a left-hand one of cores 86 has been wound with a first set of wires 84 and an adjacent right-hand one of cores 86 has been wound with a second set of wires 84 in close proximity to the first set of wires. The sidewall surfaces of cores 86 (surfaces 96) are separated by a relatively small gap G to enhance wireless power transfer efficiency. The value of G may be, for example, 100-600 microns, at least 25 microns, at least 50 microns, at least 200 microns, less than 2000 microns, less than 1000 microns, or less than 500 microns (as examples).

Figure 12:
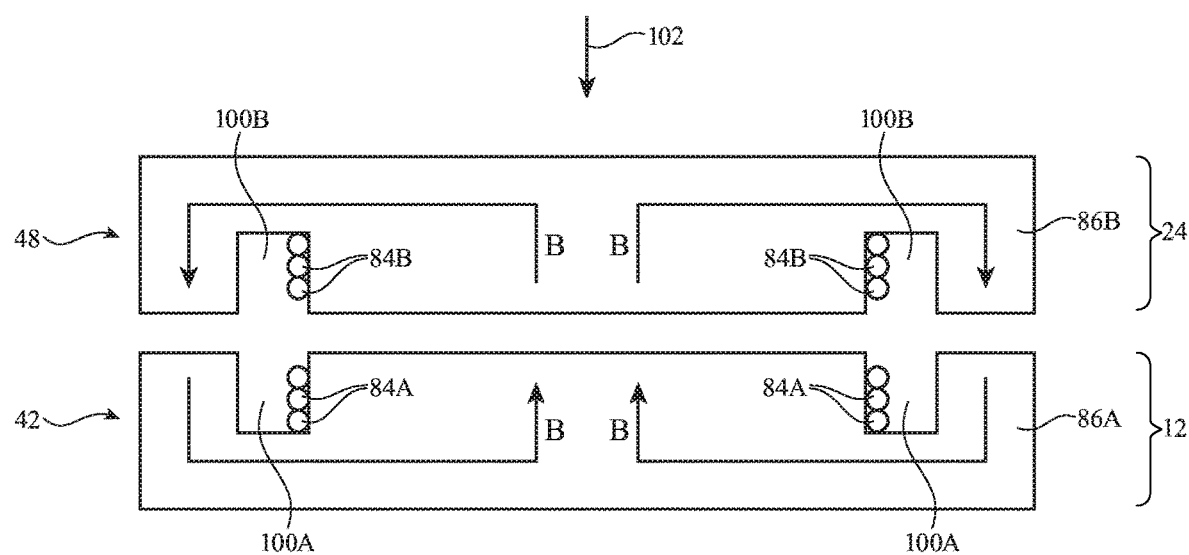
FIG. 12 is a cross-sectional side view of an illustrative mated pair of coils with pot cores that are transferring wireless power in a wireless power transmitting system in accordance with an embodiment.

Pot cores can be used in forming the magnetic core structures in coils 42 and/or 48. Consider, as an example, the pot core coils of FIG. 12 (e.g., coil 42 in device 12 and coil 48 in device 24). As shown in FIG. 12, coil 42 has core 86A and coil 48 has core 86B. Cores 86A and 86B are formed from magnetic material. Recesses such as groove 100A in core 86A and groove 100B in core 86B may be configured to receive windings 84A and 84B, respectively. The grooves may have circular outlines or outlines of other suitable shapes (rectangular, hexagonal, triangular, square, etc.). For example, groove 100A may be a circular groove and groove 100B may be a circular groove when viewed in direction 102 (e.g., the Z axis). The use of a circular shape for grooves 100A and 100B may allow device 24 to rotate (about the Z axis) relative to device 14 (e.g., the circular shape of the pot core grooves may provide angular orientation independence). The alignment structures used in system 8 in this type of configuration may also exhibit angular independence. For example, each pot coil core may have a circular periphery that is surrounded by a circular alignment magnet 80 or sets of alignment magnets 80 may be used around the pot core coil that allow device 24 to be placed in multiple different angular orientations with respect to device 12 while still ensuring that the pot cores of coils 42 and 48 are aligned satisfactorily.

The foregoing is merely illustrative and various modifications can be made to the described embodiments. The foregoing embodiments may be implemented individually or in any combination.

What is claimed is:

1. A portable electronic device configured to receive wireless power signals transmitted by a wireless power transmitting device, comprising:

a figure eight coil having a first post with counterclockwise wire windings wound helically along the first post and a second post with clockwise wire windings wound helically along the second post, wherein the figure eight coil is configured to receive the wireless power signals; and rectifier circuitry coupled to the figure eight coil, wherein the rectifier circuitry is configured to produce direct-current power from the received wireless power signals.

2. The portable electronic device of claim 1 further comprising alignment structures configured to align the figure eight coil to a corresponding wireless power transmitting coil in the wireless power transmitting device.

3. The portable electronic device of claim 2 wherein the alignment structures include at least one magnet.

4. The portable electronic device of claim 2 wherein the wireless power transmitting device has transmitting device magnets located on opposing sides of the wireless power transmitting coil and wherein the alignment structures include a pair of receiving device magnets configured to align with the transmitting device magnets.

5. The portable electronic device of claim 1 further comprising a coil with a single loop of wire windings that is configured to receive the wireless power signals.

6. The portable electronic device of claim 1 further comprising:

a housing;

a display coupled to the housing; and a coil with a single loop of wire windings that overlaps the display.

7. The portable electronic device of claim 6 wherein the coil with the single loop of wire windings and the figure eight coil overlap different respective portions of the display.

8. The portable electronic device of claim 1 wherein the first and second posts overlap a layer of magnetic material that is configured to direct magnetic field from the second post into the first post.

9. The portable electronic device of claim 8 wherein the layer of magnetic material has a thickness of 50-300 microns.

10. The portable electronic device of claim 1 wherein the wireless power transmitting device has a transmitting coil with a first number of wire turns, wherein the figure eight coil has a second number of wire turns, and wherein the second number of wire turns is greater than the first number of wire turns.

11. A power transmitting device configured to transmit wireless power to a power receiving device, comprising:

wireless power transmitting circuitry that includes a coil with a pot core and wire windings, wherein the pot core has magnetic material with a groove, and wherein the wire windings are wound vertically in the groove; and control circuitry configured to transmit the wireless power to the power receiving device using the wireless power transmitting circuitry.

12. The power transmitting device of claim 11 wherein the wireless power transmitting circuitry comprises an inverter coupled to the wire windings.

13. The power transmitting device of claim 11 further comprising at least one alignment magnet that is configured to mate with a corresponding alignment magnet in the power receiving device.

14. The power transmitting device of claim 11 wherein the groove is a circular groove.

15. A wireless power transmitting device, comprising:
wireless power transmitting circuitry that includes an array of solenoids, wherein each solenoid has a post of magnetic material surrounded by multiple turns of wire; and
control circuitry configured to transmit the wireless power to a power receiving device using the wireless power transmitting circuitry.

16. The wireless power transmitting device of claim 15 wherein the wire has a wire diameter, wherein the posts are separated from each other by gaps, and wherein each gap is 2 to 4 times the wire diameter.

17. The wireless power transmitting device of claim 15 wherein the posts have square outlines.

18. The wireless power transmitting device of claim 15 wherein the posts comprise outlines selected from the group consisting of: triangular outlines and hexagonal outlines.

19. The wireless power transmitting device of claim 15 wherein the array of solenoids is overlapped by a charging surface, wherein each post is characterized by a maximum lateral dimension extending along the charging surface, and wherein the maximum lateral dimension is less than 1.5 cm.

20. The wireless power transmitting device of claim 15 wherein the posts each have a height, wherein the posts each have a maximum lateral dimension perpendicular to the height, and wherein the posts have a ratio between the height and the maximum lateral dimension of at least 0.2.

\* \* \* \* \*